(12) United States Patent
Gieseler et al.

(10) Patent No.: US 7,734,195 B2
(45) Date of Patent: Jun. 8, 2010

(54) METHOD AND ARRANGEMENT FOR FORMING RECEPTION PULSES IN AN INFRARED RECEIVER

(75) Inventors: Michael Gieseler, Dresden (DE); Manfred Sorst, Radebeul (DE)

(73) Assignee: Zentrum Mikroelektronik Dresden AG, Dresden (DE)

( * ) Notice: Subject to any disclaimer, the term of this patent is extended or adjusted under 35 U.S.C. 154(b) by 982 days.

(21) Appl. No.: 10/560,458

(22) PCT Filed: Jun. 18, 2004

(86) PCT No.: PCT/DE2004/001244

§ 371 (c)(1), (2), (4) Date: May 15, 2006

(87) PCT Pub. No.: WO2005/006601

PCT Pub. Date: Jan. 20, 2005

(65) Prior Publication Data

US 2007/0041736 A1 Feb. 22, 2007

(30) Foreign Application Priority Data

Jun. 25, 2003 (DE) ............................ 103 28 749

(51) Int. Cl.
*H04B 10/06* (2006.01)
*H03K 9/00* (2006.01)

(52) U.S. Cl. ................. 398/208; 398/202; 375/316

(58) Field of Classification Search ........... 398/202, 398/208; 375/316
See application file for complete search history.

(56) References Cited

U.S. PATENT DOCUMENTS

| 5,014,286 | A | * | 5/1991 | Ransijn | 375/360 |
| 5,838,471 | A | * | 11/1998 | Beard | 398/136 |
| 6,169,765 | B1 | | 1/2001 | Holcombe | 375/238 |
| 6,198,766 | B1 | | 3/2001 | Schuppe | 375/239 |
| 6,240,283 | B1 | * | 5/2001 | Holcombe | 455/245.1 |
| 6,304,600 | B1 | | 10/2001 | Chiba | 375/239 |
| 2002/0154373 | A1 | * | 10/2002 | Akashi | 359/189 |
| 2004/0075484 | A1 | * | 4/2004 | Nishizono et al. | 327/345 |

FOREIGN PATENT DOCUMENTS

| DE | 690 30 990 | 2/1998 |
| DE | 697 07 851 | 5/2002 |
| EP | 0 905 947 | 3/1999 |

* cited by examiner

*Primary Examiner*—Nathan M Curs
(74) *Attorney, Agent, or Firm*—Kevin P. Radigan, Esq.; Heslin Rothenberg Farley & Mesiti P.C.

(57) ABSTRACT

In a method and arrangement for forming reception pulses, output signals of an upstream comparator which recognizes light pulses are used to evaluate a downstream arrangement and are newly formed and emitted as pulses. The aim is to produce a method and an associated circuit arrangement for forming reception pulses which represent a saving in energy, whereby said arrangement can be integrated into existing receiver systems, requires no external time base and can work with the signal of an upstream comparator. In a first step, an input signal delivered by an upstream comparator is delayed, whereupon a time reference is produced in a controlled manner and an output pulse begins to be formed in a controlled manner by means of the delayed input signal from the first step. The input signal level is examined once production of the time reference is completed. The examination refers back to the length of the received pulse, and the duration of the output impulse is adjusted according to the results of the examination.

7 Claims, 6 Drawing Sheets

METHOD AND ARRANGEMENT FOR FORMING RECEPTION PULSES IN AN INFRARED RECEIVER

CROSS REFERENCE TO RELATED APPLICATIONS

This application is a 371 filing of PCT International application no. PCT/DE2004/001244 filed Jun. 18, 2004 and published in German as WO 2005/006601 A1 on Jan. 20, 2005, which claims priority of German application no. 103 28 749.3 filed Jun. 25, 2003, the disclosures of which are hereby incorporated herein by reference in their entirety.

BACKGROUND OF THE INVENTION

The invention relates to a method and arrangement for forming reception pulses in a receiver operating according to the IrDA standard, wherein the output signals of an upstream comparator that recognizes light pulses are used for evaluation by a downstream arrangement, and re-formed and emitted as pulses.

In data transfer by means of infrared light according to the IrDA standard (Infrared Data Association) in the specification of FIR (Fast Infrared), for example, wherein the 4 PPM (four pulse position modulation) modulation type is used, post-processing steps must be done for the output pulses produced by a comparator. In this modulation type two data bits are consolidated to one data bit pair (DBP). A period of 500 ns, divided into four 125 ns time slices, is available for transferring a DBP. One position or one chip, which is represented by an optical pulse, is discretely allocated to each of the four possible 2-bit words. Thus the coding depends on the position of the single pulse within the 500 ns time period. Consequently it may happen that the fourth position of the code "n" is occupied and immediately following the first position of the code "n+1". In this case both single pulses merge into a double-wide [viz. double-duration] so-called double pulse. Due to the properties of this 4 PPM modulation type both single pulses with a 125 ns pulse duration and double-pulses with 250 ns pulse duration are transferred and made recognizable as such at the output of a circuit for post-processing of the pulses produced by the comparator at the digital output RxD of a receiver.

An amplifier built into the infrared receiver must have an appropriately large bandwidth in order satisfy these transfer requirements. In practice, due to the high power consumption in a correspondingly large bandwidth, a limited bandwidth is available whose value is defined by the requirements for transferring the single and the double pulses. Thus in the critical case, depending on the input current amplitude, there is an lengthening of the single pulses and a shortening of the double impulses within the transfer range.

A circuit for post-processing of the output signals of a comparator consists in the simplest case of a monoflop for forming the single pulse. In the case of transferring a double pulse a combinatorial lengthening of the single pulse supplied by the monoflop corresponding to the amplifier dynamics of said pulse. Thus, although the single pulse is newly produced, the double pulse is composed only from a produced single pulse and the pulse remnant dependent on and distorted by the amplifier dynamics.

Furthermore, for example as taught by U.S. Pat. No. 6,198, 766 B1, more complex circuits for subsequent processing are known which define an ideal time pattern using an external time basis and synchronize the comparator pulses either in this pattern or even modify them adaptively.

The very simple and space-optimum solution of a single monoflop for forming the single pulses has the significant drawbacks that on the one hand excessively long single pulses with strongly varying pulse duration at the comparator output are stretched beyond the monoflop time by the logic required for the transfer of the double pulses at the output RxD of the subsequent processing circuit. On the other hand the double pulse itself is transferred only combinatorily and is not processed at all. Accordingly, at the RxD output only the direct and unstable pulse duration of the comparator appears at all times. Both effects can result, independently of each other, in a stalling of the data transfer according to the IrDA standard, if in certain dynamic areas the pulse durations no longer conform with the requirements imposed on minimum and/or maximum pulse duration requirement. On the other hand, the demand of transfer of the light pulses as faithfully as possible to the pulse via the amplifier compels greater amplifier bandwidth. This results on the one hand in high operating power and on the other hand, because of the low lower cut-off frequency, for example, large, area intensive coupling capacities.

Systems approaches with external synchronization require either an additional clock input or an integrated quartz oscillator that generates an adequate time base. For the jitter requirements of 20 ns given in the FIR specification to be maintained this solution requires sampling rates of at least 40 MHz which is equivalent also to the clock rate of the I/O circuit. Along with a circuit that is more complex and requires more space with this timing and its utilization there is also an interference source on the chip which is isolated from the sensitive amplifier complex by means of additional shielding schemes that also occupy considerable space.

BRIEF SUMMARY OF THE INVENTION

Consequently the invention addresses the problem of describing a method and an associated circuit arrangement for forming reception pulses whereby a space- and energy-efficient forming of reception pulses is achieved which can be integrated into existing reception systems, does not require an external time base and operates satisfactorily with the signal from an upstream comparator.

According to the invention this problem is solved with a method for forming reception pulses of the type described in the introductory part in that in a first step an input signal delivered by the upstream comparator is delayed; in that production of a time reference is started, said production being controlled by the input signal; in that the forming of an output signal is started, said forming being controlled by the input signal delayed in the first step; in that the input signal level examination is carried our once production of the time reference is completed, which provides a back reference to the received pulse length and in that the duration of the output pulse is adjusted subject to the results of the examination.

In a first step an input signal delivered by the upstream comparator is delayed. This delay produces a buffer time within which a decision on a possible first impulse length or second impulse length, such as a first and a second pulse, for example, is made at the Input (INP). Generation of the time reference is started in parallel with the arrival of an input pulse edge at INP or temporally delayed relative to same. This determines the point in time of the examination of the input signal level at high- or low-level and consequently, for example, a back reference to the reception of a single or double pulse when using 4 PPM modulation. When this is done the method according to the invention manages without an external time base, because the fixed coupling of the point in time of the examination occurs at the input pulse edge of the pulse transferred from the comparator.

By virtue of the delayed input signal at the E2 input of the output pulse producing arrangement the forming of an output pulse is started and output at the A3 output. This signal is a single pulse of 125 ns in length or a double pulse of 250 ns in length. This forming can occur by means of a monostable multivibrator that is switchable in terms of pulse duration, for example, whose default setting is 125 ns. The signal for selecting the pulse length is produced by an examination of the input signal level controlled by the test signal. This examination is done prior to the lapse of the pulse duration of a single pulse having a duration of 125 ns. If as the results of the examination it is determined that the received pulse is a single pulse then the adjustment of the monostable multivibrator is maintained at an impulse length of 125 ns and a single pulse is output at the output OUT. If in the results of the examination it is determined that the received pulse is a double pulse then the multivibrator is switched over to a pulse duration of 250 ns and a double pulse is output at the OUT output. Switch-over is ensured by the position of the point in time of the examination prior to the lapse of the 125 ns pulse duration and thus the production of an output pulse conforming to standard provided for. Both the duration of the first pulse and the duration of the second pulse can be changed and thus make it possible to use the method according to the invention for differentiating the pulse durations of other specifications such as SIR (serial infrared), MIR (medium infrared) and VFIR (very fast infrared).

One embodiment of the invention provides that the delay of the input signal delivered by the upstream comparator is done in a first and a second partial step and between the partial steps of the delay a regeneration of the signal is carried out.

By virtue of this division of the input pulse delay into two partial steps with the pulse reconstruction carried out between the partial steps, for example, to the length of a single pulse in the case of 4 PPM modulation it is possible to reliably transfer also short single pulses of the upstream comparator which have a pulse duration that is less than the total delay time of the input pulse delay. Without this division there would otherwise be transmission losses in the cases of pulses having a correspondingly short duration and thus lead to the loss of the pulses to be transmitted for a downstream arrangement.

A further embodiment of the invention provides that the production of the time reference is started by the input signal or the input signal delayed in the first step.

The start time for producing the time reference—that is, the necessary test signal required for the point in time of the examination of the input signal level—can occur at two points in time. On the one hand the start can occur with the arrival of the front pulse edge and on the other hand the input signal delayed in the first partial step, especially again the front pulse edge, can be used. In the second case the time period from the arrival of the front pulse flank to the point in time of the examination of the input signal level is comprised of the delay time of the first partial step and the time period generated by the time reference production arrangement itself. This time period is less in the second case than in the first case. The advantage in a smaller time period is in the utilization of a smaller, time-limited capacitance that thus also has a smaller space requirement.

One embodiment of the method according to the invention provides that the forming of an output pulse occurs such that the forming of the first pulse and a second pulse is started in parallel and subject to the examination of the input signal level either of the first or the second pulse is emitted at the output.

Forming of the necessary output pulse is carried out so that forming of a first and second pulse is started in parallel in the various assemblies.

In the case of 4 PPM modulation the first pulse, for example, is a single pulse with a pulse duration of 125 ns and the second pulse is a double pulse with a pulse duration of 250 ns. Both pulses are the input signals of a selection circuit which, controlled by the selection signal of a circuit for examining the input signal level, selects one of the two input pulses and puts it through to the output as an output signal.

According to the invention the problem in the case of an arrangement for forming reception pulses of the type described in the introductory part is solved in that the input of the delay arrangement is connected with the input to the arrangement for forming reception pulses INP for supplying comparator signals, in that a first output of the delay arrangement is connected to a first input of a downstream output pulse producing arrangement and the second output of the delay arrangement with an input of a time reference generation arrangement, in that the output of the time reference generation arrangement is connected to a second input of the output pulse producing arrangement and in that the output of the output pulse producing arrangement is connected to the output of the arrangement for forming reception pulses OUT.

The input signal INP of the arrangement according to the invention delivered by the upstream comparator is delayed in its signal transit time by means of the delay arrangement, emitted at the output A1 and represents the input signal of the downstream output pulse producing arrangement at the input E2. With the arrival of the first input signal pulse edge at the input E1 or after lapse of part of the total delay time of the delay arrangement the start signal is emitted at the output A2 said signal representing the input signal of the time reference generation arrangement. Controlled by this start signal, the production of a test signal is carried out by the time reference generation arrangement, said start signal defining the point in time of examination of the input signal level which is applied at the input E3 of the output pulse producing arrangement. The output pulse producing arrangement performs the examination of the delayed input signal level applied at input E2 at the point in time defined by the test signal and, subject to the results of the examination, issues either a first pulse or a second pulse at the output A3, which is connected to the output OUT of the arrangement according to the invention. The production of the first or second pulse to be output can, for example, be done by a monostable multivibrator that can be switched over in its pulse length, which is switched over subject to the results of the examination of the input signal level.

One embodiment of the invention provides that the delay arrangement is comprised of a series connection of a first and a second delay arrangement part and an arrangement for pulse reconstruction interconnected between both parts.

The delay arrangement is formed by a series connection of a first delay arrangement part that carries out a first partial delay of the total delay time of the arrangement, an arrangement for pulse reconstruction, which reconstructs the input signal delayed by a partial delay time by the first delay arrangement part so that the pulse has a pulse length approximating that of a single pulse and a second delay arrangement part, which carries out a second partial delay of the total delay time of the arrangement. By virtue of this division of the input pulse delay into two steps with the pulse reconstruction done between the steps it is possible to reliably transmit even short input pulses of the upstream comparator, which [the pulses] have a pulse length that is smaller than the total delay time of the arrangement. The delayed input signal delayed by the total delay time is output at the output A1. A start signal for the downstream time reference generation arrangement is emitted at output A2, said signal being produced either in parallel with the arrival of the first input signal pulse edge or after lapse of the first partial delay time. The time which must be formed by the time reference generation arrangement is smaller in the second variant and thus also the space requirement for the time-limiting capacitive part of the time reference generation arrangement.

One embodiment of the invention provides that the output pulse producing arrangement (6) is comprised of a circuit for forming a first pulse (14), a circuit for forming a second pulse (15), a circuit for examining the input signal level (13) and a selection circuit (16).

In this embodiment both a circuit for forming a first pulse and a circuit for forming a second pulse is arranged in the output pulse producing arrangement, which are started in parallel by the delayed input signal applied at the input E2. Controlled by the test signal of the time reference arrangement at input E3, the circuit for examination of the input signal level determines whether a pulse corresponding to the length of the first pulse or to the second pulse was received from the upstream comparator and a control signal is generated by the selection circuit for selecting the first or the second pulse. This circuit then puts through either the formed first or second pulse at output A3 and thus at the output OUT of the arrangement.

A particularly advantageous embodiment of the invention provides that a delay arrangement consisting of a p-channel transistor whose gate contact is connected to an input of a logical NAND-circuit and via a negator to the input "Input", whose source contact is connected to the potential VDDa and whose drain contact is connected to the input IBIA of the delay arrangement and the input of a Schmitt-trigger, a Schmitt-trigger whose negated output is connected to the second input of the logical NAND-circuit and the logical NAND-circuit, whose negated output is connected to the output of the delay arrangement "Output".

In the initial state, a high-level is applied at the input "Input" of this arrangement. This opens the p-channel transistor whereby the node point IBIA is drawn on high-level. Both a ground-side current source and a time-limiting capacitance are connected at this node point. The connected capacitance is loaded by means of the high-level applied via the p-channel transistor on the node IBIA. The NAND circuit has at both inputs a low-level and thus produces at the output-side a high-level at the output "Output". A low-level applied to the input "Input" blocks the p-channel transistor and releases the time-limiting discharge of the connected capacitance over the current source. The NAND circuit continues on the output-side at the high-level for the duration of the discharge. The end of the time procedure is reached when the voltage over the capacitance has diminished to under the switching threshold of the Schmitt-trigger. This delivers the high-signal at the NAND circuit necessary for switchover of the output "Output" to a low-level.

A further embodiment provides that in an arrangement for pulse reconstruction and for forming a first pulse, a second pulse and the time reference generation one input "Input" each is connected to a negator, that the output of the negator is connected to the first input of a downstream first NAND circuit and a series connection comprised of three negators, whose output is connected to the second input of the first NAND circuit, that the output of the first NAND circuit is connected to a first input of a second NAND circuit, that the input IBIA of the arrangement is connected to the drain contact of a p-channel transistor and via a Schmitt-trigger with the first input of a NOR circuit, that the input POC of the arrangement is connected to the second input of the NOR circuit, that the output of the NOR circuit is connected to the first input of the third NAND circuit, that the output of the third NAND circuit is connected to the second input of the second NAND circuit via a negator to the gate contact of the p-channel transistor whose source contact is connected to the potential VDDA, and to the output "Output" of the arrangement and that the output of the second NAND circuit is connected to the second input of the third NAND circuit.

Both a ground-side current source and a time-limiting capacitance is connected to the input IBIA of the arrangement. The digital differentiation circuit connected to the input "Input" of the arrangement ensures that a low-output pulse is formed from a low-input pulse of any length. Accordingly, a low-impulse of specific length is produced at the output of the first NAND circuit, whereby the adjustment of different gate cycles is carried out via the dimensioning of the components of the differentiation circuit. A high-level at the input "Input" of the arrangement produces a high-level at the output "Output" of the arrangement via the second and third NAND circuit. Upon arrival of a low-pulse at the input the switch-over of the output to a low-level occurs with a time duration determined by the capacitance connected to IBIA. The input signal "POC" acquired by a Power-on-Clear circuit ensures that the circuit cannot produce a glitch impulse at the time of power-up of the operating voltage and assumes the stable initial state High.

BRIEF DESCRIPTION OF THE DRAWINGS

The invention will be explained in greater detail in the following with reference to an exemplary embodiment. The associated drawings show FIG. 1 representing an arrangement for forming reception pulses according to the invention.

DETAILED DESCRIPTION

Figure 1:
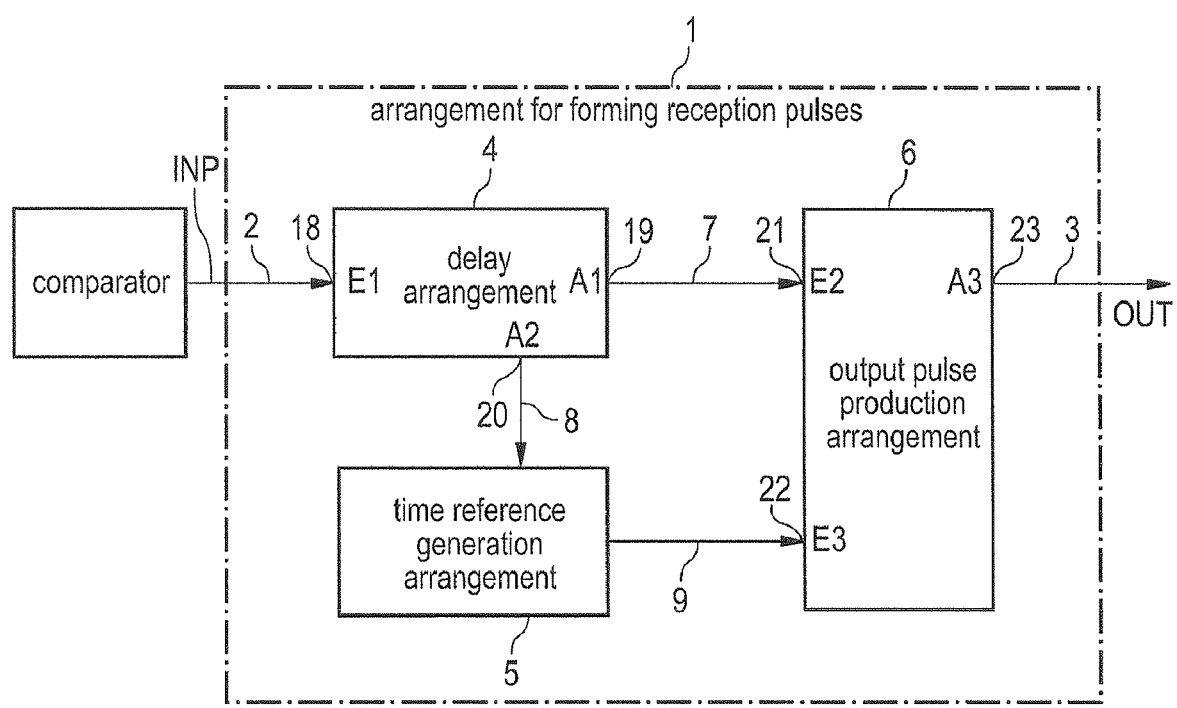

An arrangement according to the invention for forming reception pulses 1 is represented in FIG. 1. The arrangement according to the invention with its subassemblies is shown in greater detail in FIG. 2. This processes the signal produced by the upstream comparator (not shown in greater detail), which is supplied to the arrangement 1 at the input INP 2. Because the electrical signals in all IrDA protocols require negative pulses (e.g. each light pulse must be converted to a low-pulse), this circuit arrangement also continuously assumes low pulses. Therefore, all subassemblies shown in FIG. 2 are constructed so that negative input pulses are emitted again as negative output pulses after corresponding temporal processing.

For the purpose of forming, that is, for preparation of the input pulses delivered by the comparator and for output, for example, of standard single or double pulses at the output OUT 3 of arrangement 1 at a downstream circuit for evaluation of the transmitted pulses, the input of a first delay arrangement part 10 of a delay arrangement 4 is connected to the input INP 2 of the arrangement 1 for supplying the comparator signal. The output of the first delay arrangement part 10 is connected to the input of an arrangement for pulse reconstruction 12 which provides pulse broadening, to the input of a time reference generation arrangement 5, to which a start signal 8 is delivered and to an input of a flip-flop 13 via a negator. The output of the arrangement for pulse reconstruction 12 is connected to the input of a second delay arrangement part 11 of the delay arrangement 4. The output of the second delay arrangement part 11 is connected to the input of an output pulse producing arrangement 6; that is, both to the circuit for forming a first pulse 14 and to the input of the circuit for forming a second pulse 15 within the output pulse producing arrangement 6 for delivery of the delayed input signal 7. The output of the circuit for forming a first pulse 14 is connected to a first input of a multiplexer 16, the output of the circuit for forming of a second pulse 15 is connected to a second input of the multiplexer 16 and via a negator to the reset input of the flipflop 13. The output of the time reference production arrangement 5 is connected to the clock input of the flipflop 13 for transmission of the test signal 9 whose output is connected in its turn with the address input of the multiplexer 16. The output of the multiplexer 16 is connected to the output OUT 3 of the arrangement 1. The first and second delay arrangement part 10 and 11, the arrangement for pulse reconstruction 12, the time reference generation arrangement 5, the circuit for forming a first pulse 14 and the circuit for forming a second impulse 15 have, in addition to a input "Input" and an output "Output", an input IBiA for a bias current. These inputs are each connected to a ground-side current source (potential VSS) and a time-limiting capacitance C.

Figure 2:
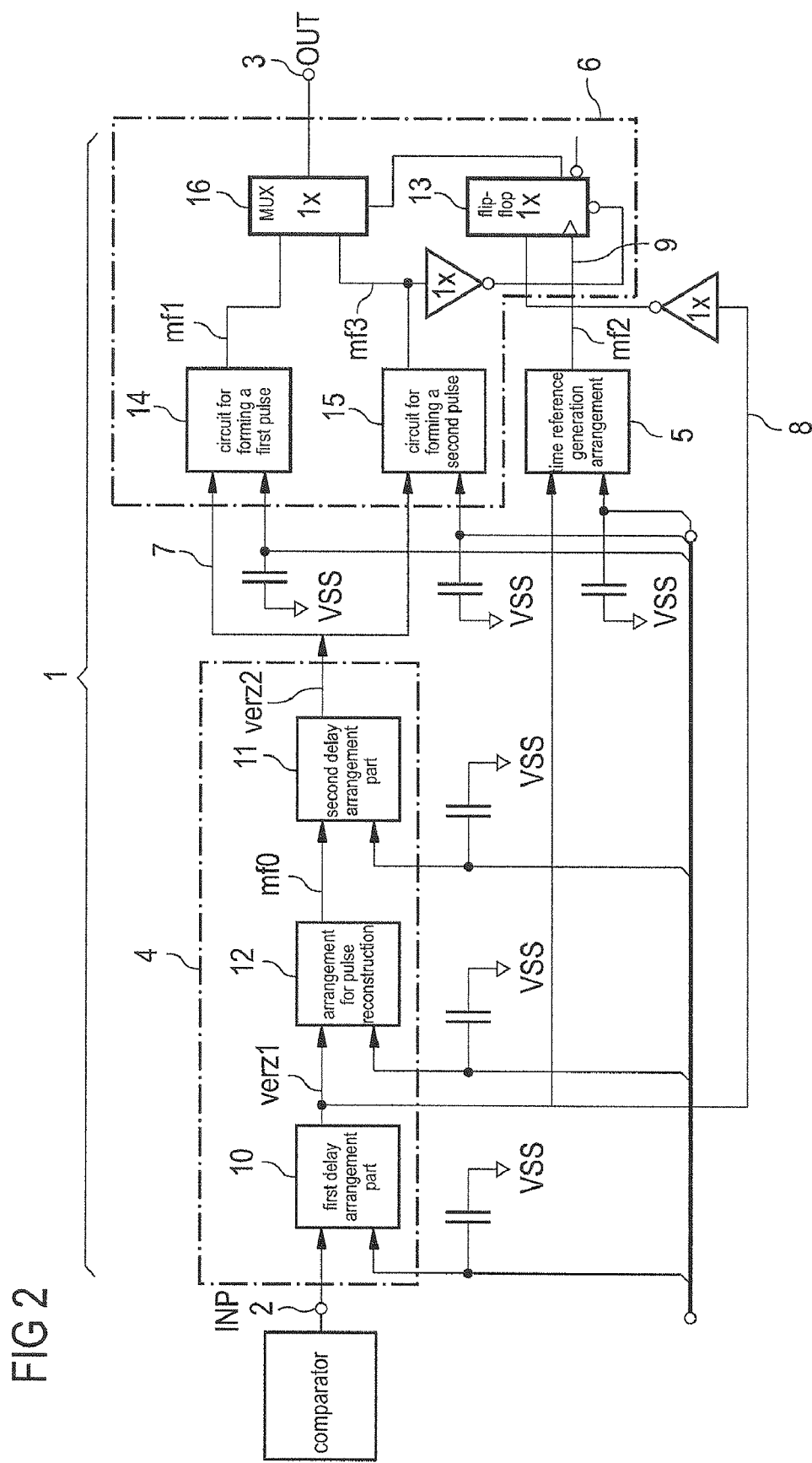
FIG. 2 representing an exemplary embodiment of the arrangement for forming reception pulses according to the invention.

The circuit according to FIG. 2 shows that the input signal prepared by the comparator is delivered at the input INP 2 to the input of the first delay arrangement part 10. This delays the descending edge of each pulse coming from the comparator by the time designated by "tdelay" and thus represents the delay occurring in the first partial step. Each ascending edge at the input of the first delay arrangement part 10 is forwarded directly to the output of the arrangement itself by the time conditional upon the gate element cycle times. This signal routing is represented for a single pulse in FIG. 3 and for a double pulse in FIG. 4. This shortening of the input pulse associated with this process is unintentional and interfering, because with already very short comparator pulses a complete disappearance of the respective pulses can occur. Therefore using the downstream arrangement for pulse reconstruction 12 a pulse width again approximating, for example, the single pulse duration of 125 ns is reconstructed. Here, the exact pulse duration at the output of the arrangement for pulse reconstruction 12 is of secondary import. It is important that the internal configuration of all delay arrangement parts 10 and 11 consistently reproduce exactly the ascending edge of the respective input signal and that/those of the arrangement for pulse reconstruction 12 incoming signal each exactly reproduce the descending edge of the input signal. The length of the reconstructed pulse of the arrangement for pulse reconstruction 12 is determined by their bias current IBIA and the associated capacitance connected to IBIA. Here, the pulse duration is defined as the time in which the output signal is low-level. A second delay arrangement 11 is linearly connected to the arrangement for pulse reconstruction 12 whose delay time likewise is defined by the associated current IBIA and the capacitance connected at input IBIA. The output of the second delay arrangement part 11 is connected to the inputs of the circuit for forming a first impulse 14 and the circuit for forming a second impulse 15. Here, the associated bias currents and capacitances should be dimensioned so that at the output of the circuit for forming a first pulse 14, for example, when using 4 PPM modulation the required single pulse length of 125 ns occurs for a single pulse and at the output of the circuit for forming a second pulse 15 the required double pulse width of 250 ns occurs. Furthermore, the time reference generation arrangement 5, which by means of the test signal 9 produces the decision time for differentiation of single and double pulses, is addressed directly by the output of the first delay arrangement part 10. The adjustment of the time period "tmono" of the time reference generation arrangement 5 is done by mans of the associated current IBIA and the time-limiting capacitance connected at the input IBIA. The output signal of the time reference generation arrangement 5 is used as the clock input for a statistical D-Master-Slave flipflop 13. The data input of the D-Master-Slave flipflop 13 is connected to the inverted output signal of the first delay arrangement part 10. The asynchronous low-active reset input is connected to the inverted output signal of the circuit for forming a second pulse 15. The output of the D-flipflop addresses a multiplexer 16, whose data inputs are addressed by the outputs of the circuit for forming a first pulse 14 (at I0) and the circuit for forming a second impulse 15 (at I1). The output Z of the multiplexer 16 forms the output of the arrangement for forming reception pulses 1, at which—subject to the input signal—a formed single or double pulse is emitted.

The object of the circuit arrangement 1 is to decide, with each pulse reaching the input INP2 from the comparator, whether said pulse is a single or a double pulse. The aim is to produce formed single or double pulses independent of the comparator pulse duration. Here it is advantageous for the decision value if these, subject to the characteristics of the upstream analog circuit, lie in the centrally between the maximum occurring single pulse duration and the minimum occurring double pulse duration (at the comparator output). Here, the fundamental concern is that double pulses never degenerate into two single pulses following closely upon each other.

According to the invention this problem is solved in that a shifting of the input signal is done so that a time slot occurs during which a decision can be made, whether a pulse with a lesser or greater pulse duration that that defined by a decision value was applied to the circuit input INP 2. All time shifts are done by means of delay circuits that shift only the descending edge of the input signal. This is the edge which is triggered with "Light ON" and thus identifies the pulse start. Because at the output of the comparator very narrow pulse durations and thus in the case of single pulses clearly lying below 125 ns—especially at the limit of sensitivity—occur, a regeneration of the pulse duration at single pulse duration is carried out after the first delay in the first delay arrangement part 10, resulting in a shortening of the pulse, by means of an arrangement for pulse reconstruction 12. The second delay arrangement part 12 subsequently generates the second part of the required time slot. A concentrated execution of the signal delay is not possible due to the necessity described of being able to process very short comparator pulses.

Because for every pulse the rise-edge, separately considered, lies at the same position in the time pattern, a datum on the pulse duration must be derived no later than before pulse regeneration using the arrangement for pulse reconstruction 12. In principle, there is the possibility of deriving this signal either from the input of the circuit arrangement INP 2 or, however, from the output of the first delay arrangement part 10. This information is available in pristine form only at these two positions via the fall edge. For reasons of expediency the output signal of the first delay arrangement part 10 is used, because the time to be realized in the time reference generation arrangement 5 is less "tdelay" of the first delay arrangement part 10 and a more area-wise advantageous solution results. After lapse of the summary time shift of the first delay arrangement part 10 and of the second delay arrangement part 11 (2*tdelay), the circuit for forming a first pulse 14 and the circuit for forming a second pulse 15, for example, are started in parallel in the case of 4 PPM for production of a single pulse and for production of a double pulse. The output signals of the forming circuits 14 and 15 are delivered to the data inputs of a 2-channel multiplexer. Depending on the addressing of the multiplexer 16, controlled by the output signal of the D-flipflop 13, either the output signal of the circuit for forming a first pulse 14 or the circuit for forming a second pulse 15 is delivered to the output of the circuit arrangement OUT 3, so that at said output OUT 3 either a generated single pulse or a generated double pulse is emitted.

The time reference generation arrangement 5, controlled by the start signal 8, produces the test signal 9 for the differentiation of the single and double pulses. Generally, the following applied as the time base for the interpretation of the incoming pulse duration:

$$tref = tdelay + tmono$$

Because the circuit for forming a second pulse 15 without pulses at the output is constantly high-level the reset state in flipflop 13 is suspended only during the course of the "tmono" time. Only during this time can the state of the comparator output existing at this time or of the signal at the output of the first delay arrangement part 10 be sampled and the flipflop 13 then switched over and precisely then, when the output of the first delay arrangement part 10 is low-level at that moment. Because the flipflop 12, after completion of the respective longest process with the low-high-edge at the output of the circuit for forming a second pulse 15 is asynchronously reset, each new process always starts in the "Reset" state of the flipflop 13 and thus with addressing of the circuit for forming a first impulse 14. The adjustment of single impulses at the output of the multiplexer 16 is thus provided. Since, by virtue of the simultaneous start of the circuit for forming a first pulse 14 and the circuit for forming a second pulse 15 are both low-level at the time of switch-over the address change on the multiplexer is non-critical from the point of view of glitches.

Figure 3:
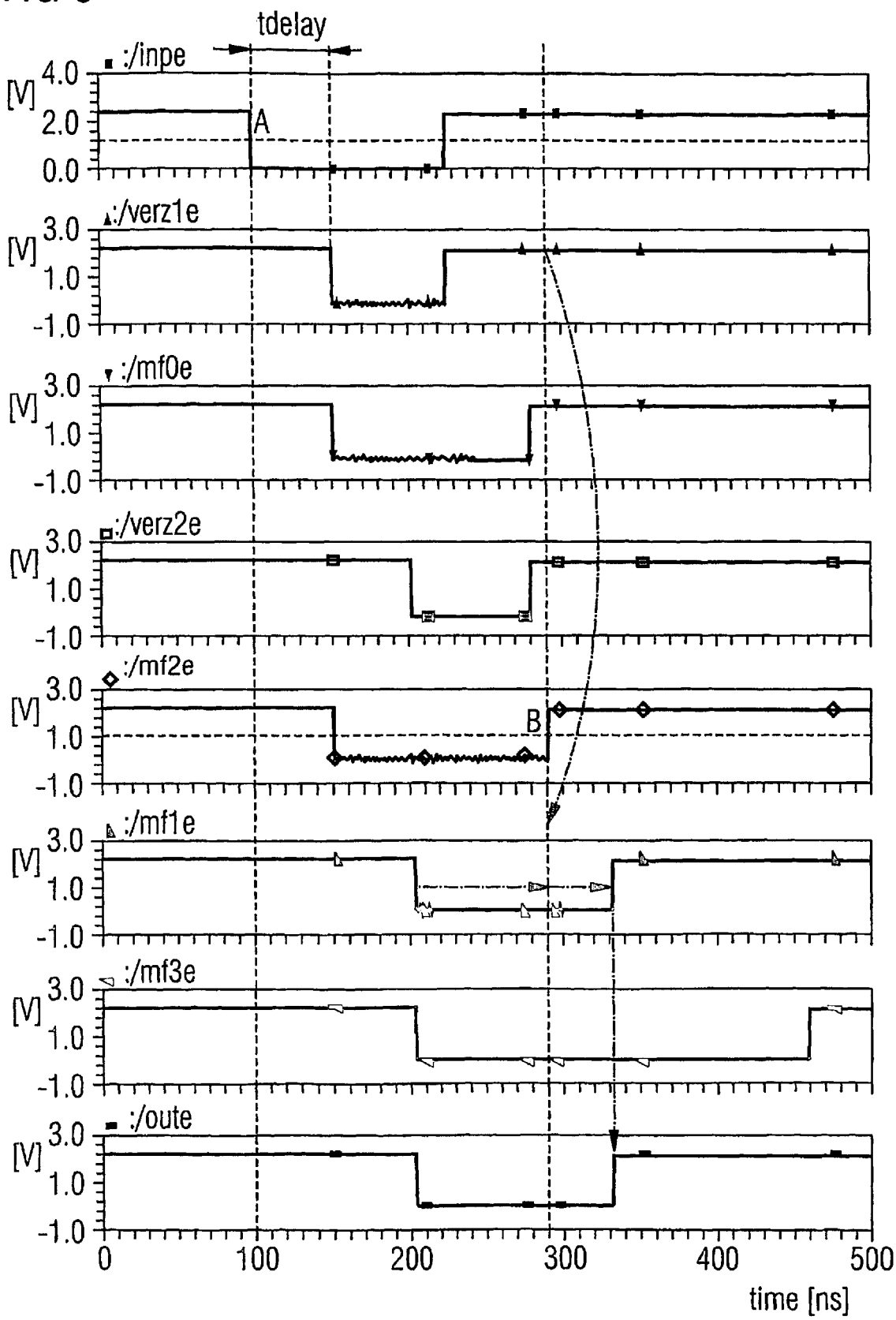
FIG. 3 representing a time-lapse diagram of the signal flow for the example of transmission of a single pulse.
Figure 4:
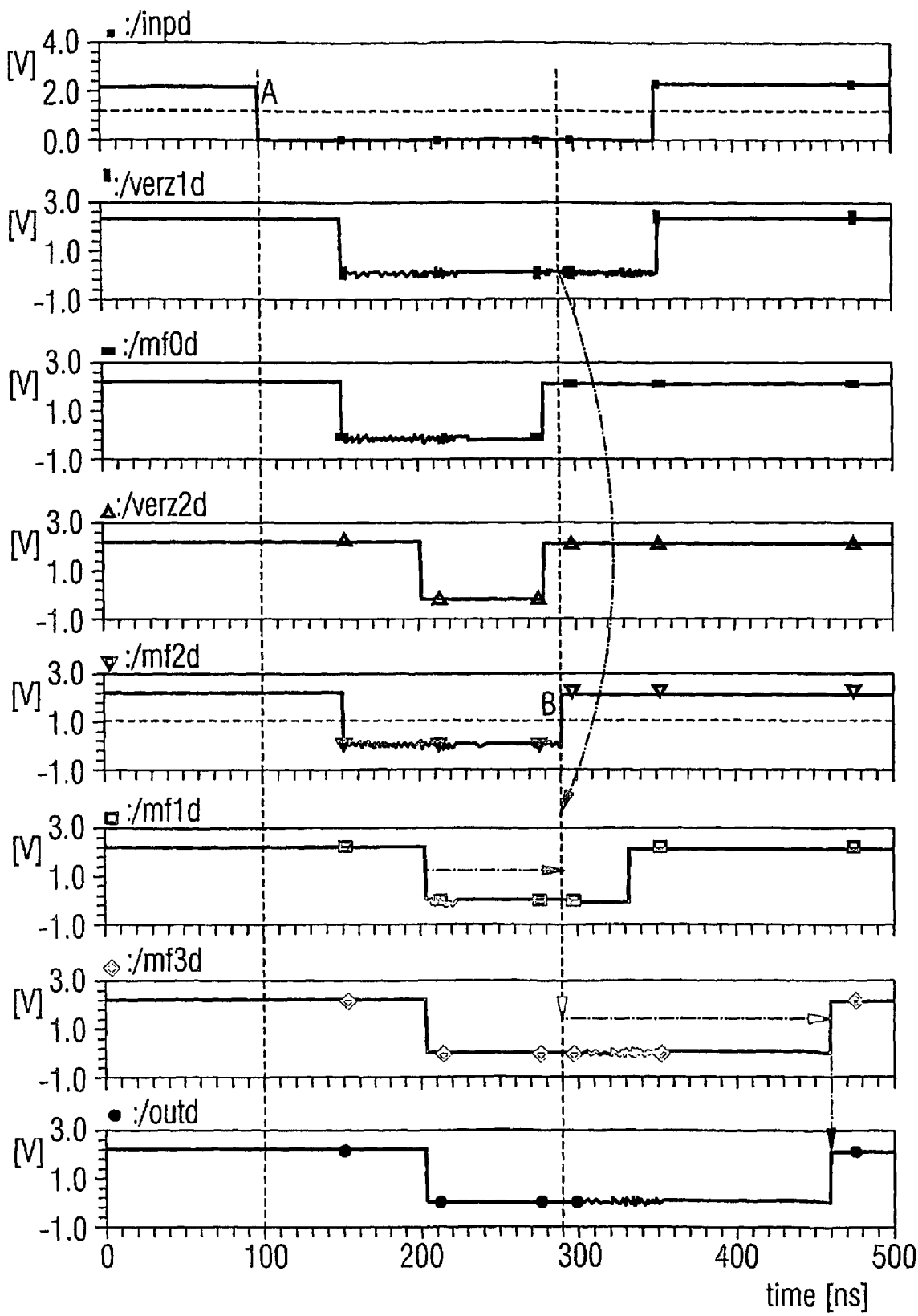
FIG. 4 representing a time-lapse diagram of the signal flow for the example of the transmission of a double pulse in the case of 4 PPM modulation.

FIG. 3 and FIG. 4 show typical signal trackings for the processing of single pulses (125 ns) and double pulses (250 ns) using 4 PPM modulation.

Figure 5:
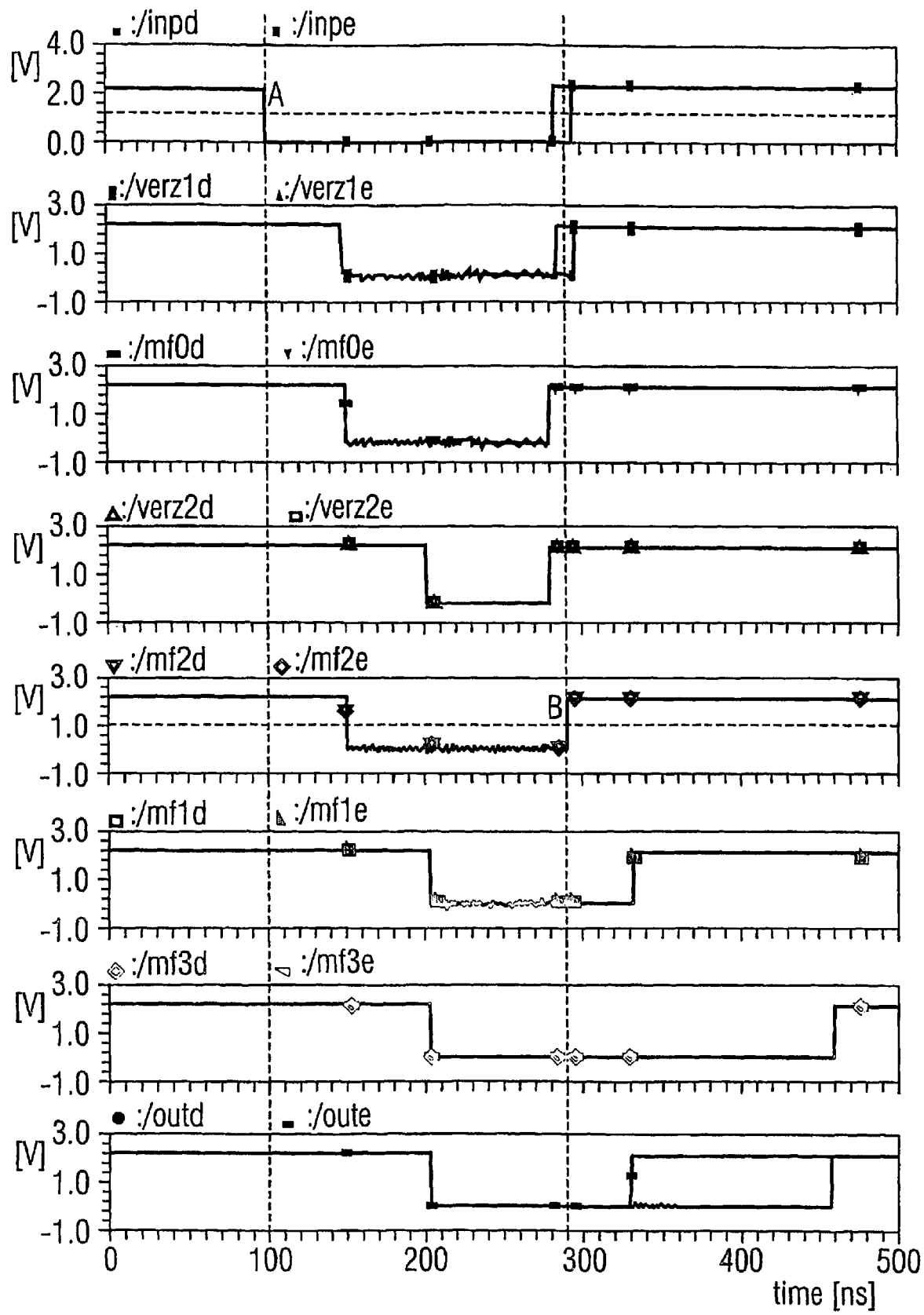
FIG. 5 representing a time-lapse diagram of the signal flow for the example of transmission with a maximum single pulse duration and a minimum double pulse duration.

It can be seen in these figures how the state at the output of the first delay arrangement part at the point in time of the low-high-edge of by the time reference generation arrangement 5 makes the decision on the selection of the impulses from the circuit for forming a first pulse 14 or the circuit for forming a second pulse 15. FIG. 5 represents as an extreme case the limits within which an unusually long single pulse (186 ns) can still be differentiated from an unusually short double pulse (196 ns). The impulse durations emitted by the comparator can be up to this limit which lies way outside of the pulse durations defined in the IrDA standard. By using this type of circuit the demands on the analog complex of the receiver circuit are reduced.

Figure 6:
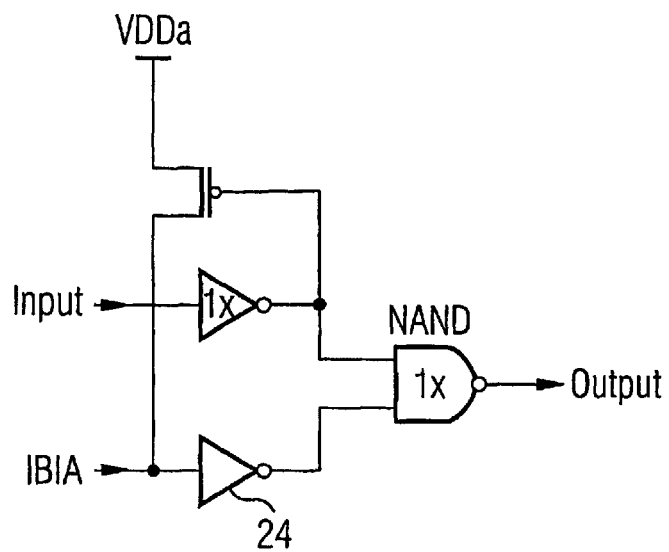
FIG. 6 representing an exemplary embodiment for a delay circuit.
Figure 7:
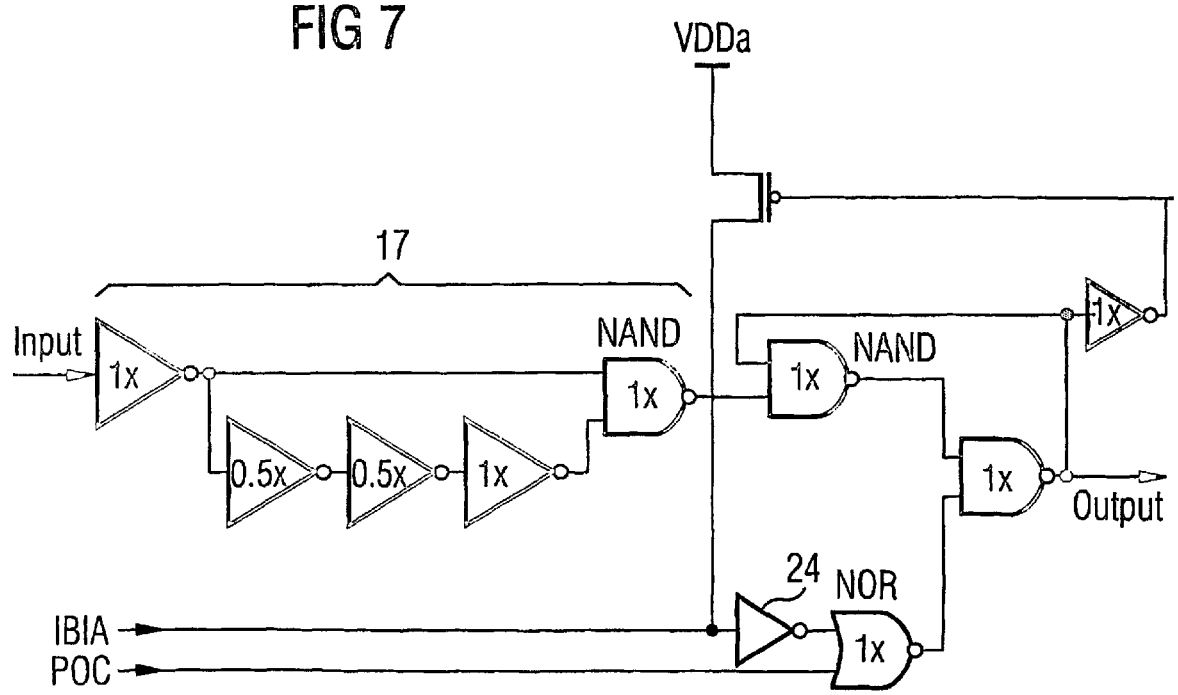
FIG. 7 representing an exemplary embodiment of an arrangement for pulse reconstruction and all monostable multivibrators.

FIG. 6 shows an exemplary embodiment for a delay circuit according to the prior art. FIG. 7 shows an embodiment of an arrangement for pulse reconstruction and for forming a first pulse, a second pulse and the time reference generation wherein the length of the output pulse generated of the arrangement is adjusted by means of technological dimensioning of the gate components of a differentiation circuit 17.

REFERENCE SIGN LIST

1 Arrangement for forming reception pulses
2 Input INP
3 Output OUT
4 Delay arrangement
5 Time reference generation arrangement
6 Output pulse production arrangement
7 Delayed input signal
8 Start signal
9 Test signal
10 First delay arrangement part
11 Second delay arrangement part
12 Arrangement for pulse reconstruction
13 Flip-flop
14 Circuit for forming a first pulse
15 Circuit for forming a second pulse
16 Multiplexer
17 Differentiation circuit
18 First input
19 First output
20 Second output
21 Second Input
22 Third input
23 Third output
24 Schmitt trigger

The invention claimed is:

1. A method for forming an output reception pulse in a receiver wherein an input signal from an upstream comparator that recognizes light pulses is newly formed and output as the output reception pulse for evaluation by means of a downstream arrangement, wherein: in a first step, the input signal is delivered by the upstream comparator; the input signal is delayed by a delay arrangement; generation of a time reference by a time reference generation arrangement controlled by the input signal is started; controlled by the input signal delayed in the first step, forming of an output reception pulse by an output pulse production arrangement is started; upon completion of the generation of the time reference, an examination of a level of the input signal is conducted which carries out a back-reference to duration of the output reception pulse; and subject to results of the examination, the duration of the output reception pulse is adjusted by the output pulse production arrangement, wherein duration of the output reception pulse is independent of actual pulse duration of the input signal delivered by the upstream comparator; and wherein the delay by the delay arrangement of the input signal delivered by the upstream comparator is done in a first and a second partial step and that between the first and second partial steps, a regeneration of the signal is carried out.

2. The method according to claim 1, wherein the generation of the time reference by the time reference generation arrangement is started by the input signal or the input signal delayed in a first partial step.

3. A method for forming an output reception pulse in a receiver wherein an input signal from an upstream comparator that recognizes light pulses is newly formed and output as the output reception pulse for evaluation by means of a downstream arrangement, wherein: in a first step, the input signal is delivered by the upstream comparator; the input signal is delayed by a delay arrangement; generation of a time reference by a time reference generation arrangement controlled by the input signal is started; controlled by the input signal delayed in the first step, forming of an output reception pulse by an output pulse production arrangement is started; upon completion of the generation of the time reference, an examination of a level of the input signal is conducted which carries out a back-reference to duration of the output reception pulse; and subject to results of the examination, the duration of the output reception pulse is adjusted by the output pulse production arrangement, wherein duration of the output reception pulse is independent of actual pulse duration of the input signal delivered by the upstream comparator; and wherein the forming of the output pulse by the output pulse production arrangement is done such that forming of a first pulse and a second pulse is started in parallel and subject to the examination of the input signal level either the first or the second pulse is emitted at the output.

4. An arrangement for forming an output reception pulse in a receiver wherein an input comparator signal from an upstream comparator that recognizes light pulses is newly formed for evaluation by a downstream arrangement, wherein an input of a delay arrangement is connected to an output of the upstream comparator, for supply of the input comparator signal, wherein a first output of the delay arrangement is connected to a first input of a downstream output pulse producing arrangement and a second output of the delay arrangement is connected to a time reference generating arrangement, the first output and the second output being different outputs of the delay arrangement, wherein an output of the time reference generating arrangement is connected to a second input of the output pulse producing arrangement and, wherein an output of the output pulse producing arrangement is connected to the output OUT of the arrangement for forming the output reception pulse, wherein duration of the output reception pulse is adjusted by the output pulse producing arrangement, and duration of the output reception pulse is independent of actual pulse duration of the input comparator signal; and wherein the delay arrangement is comprised of a series connection of a first and a second delay arrangement parts and an arrangement for pulse reconstruction installed between the first and second delay arrangements parts.

5. The arrangement according to claim 4, wherein the output pulse producing arrangement is comprised of a circuit for forming a first pulse, a circuit for forming a second pulse, a circuit for examining the input signal level and a selection circuit.

6. The arrangement according to claim 4, wherein the delay arrangement comprises a p-channel transistor whose gate contact is connected to an input of a logical NAND circuit and via a negator to a primary input whose source contact is connected to a potential VDD and whose drain contact is connected to an input IBIA of the delay arrangement and to the input of a Schmitt trigger, a Schmitt trigger whose negated output is connected to a second input of the logical NAND circuit and the logical NAND circuit whose negative output is connected to a primary output of the delay arrangement.

7. The arrangement according to claim 4, wherein in an arrangement for pulse construction and for forming a first pulse, a second pulse and the time reference generation, a respective primary input is connected to a negator, wherein an output of the negator is connected to a first input of a downstream first NAND circuit and a series connection comprised of three negators whose output is connected to a second input of the first NAND circuit, wherein an output of the first NAND circuit is connected to a first input of a second NAND circuit, wherein an input IBIA of the arrangement is connected to a drain contact of a p-channel transistor and is connected via a Schmitt-trigger to a first input of a NOR circuit, wherein an input POC of the arrangement is connected to a second input of the NOR circuit, wherein an output of the NOR circuit is connected to a first input of a third NAND circuit, wherein an output of the third NAND circuit is connected to the second input of the second NAND circuit, via a negator to a gate contact of the p-channel transistor whose source contact is connected to a potential VDDa, and to a primary output of the arrangement and wherein an output of the second NAND-circuit is connected to a second input of the third NAND circuit.

* * * * *